A. ALDEN.
Brush Handle.
No. 57,656.
Patented Sept. 4, 1866.
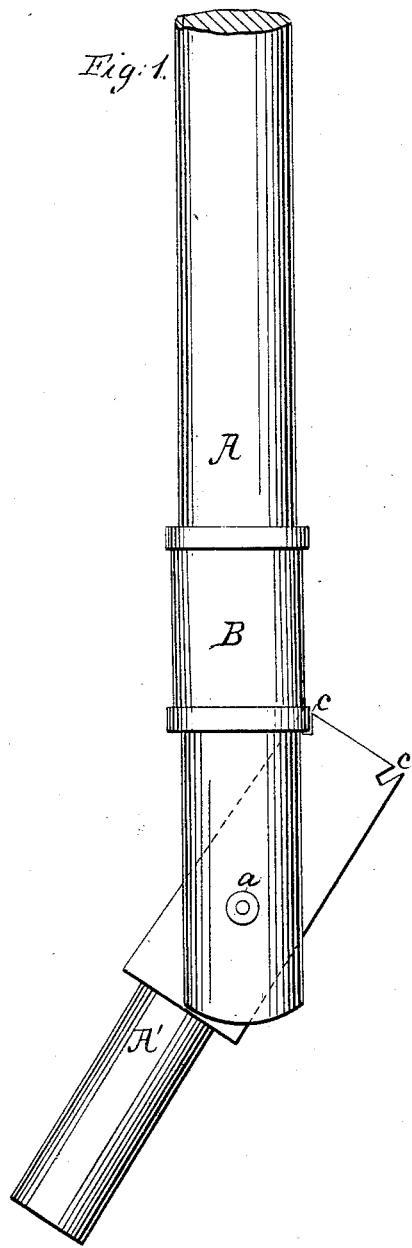
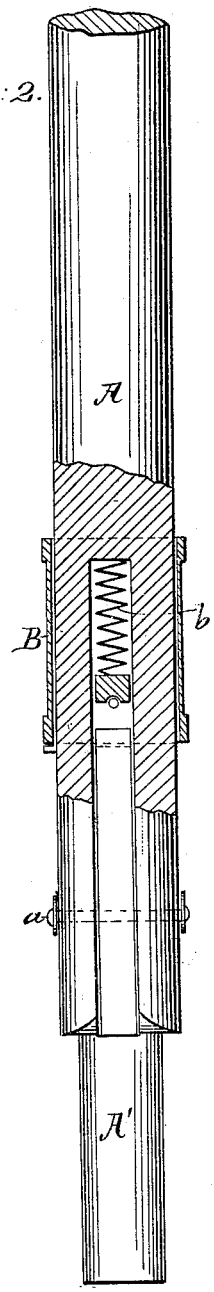
Witnesses.
Inventor

UNITED STATES PATENT OFFICE.

ALBERT ALDEN, OF NEW YORK, N. Y.

IMPROVED HANDLE FOR BRUSHES.

Specification forming part of Letters Patent No. 57,656, dated September 4, 1866.

*To all whom it may concern:*

Be it known that I, ALBERT ALDEN, of the city, county, and State of New York, have invented a new and Improved Adjustable Handle for Brushes; and I do hereby declare that the following is a full, clear, and exact description thereof, which will enable others skilled in the art to make and use the same, reference being had to the accompanying drawings, forming part of this specification, in which—

Figure 1 represents a side elevation of this invention. Fig. 2 is a longitudinal section of the same.

Similar letters of reference indicate like parts.

This invention consists in the arrangement of a sleeve which slides up and down on the upper part of the handle, in combination with a series of notches in the top edge of the hinged lower part of said handle, in such a manner that, by causing the sleeve to catch over the edges of the lower part, the two parts of the handle are rendered rigid in a rectilinear position, and by allowing said sleeve to drop in one of the notches in the top edge of the lower part the handle can be adjusted to any desired inclination.

A A' represent a handle, the two parts of which are hinged together by a pivot, *a*, as clearly shown in the drawings. On the upper part, A, is fitted a sleeve, B, which slides up and down thereon, and which is subjected to the action of a spring, *b*, which has a tendency to force the same down. This spring may be applied in many different ways, and I do not wish to restrict myself to the precise manner shown in the drawings.

If the sleeve is permitted to drop down over the edges of the lower part the two parts of the handle are rendered rigid in a rectilinear position, similar to the handles of parasols and other articles.

The lower part, A', of my handle is provided with notches *c* in its top edge, capable of receiving the bottom edge of the sleeve B, as shown in Fig. 1 of the drawings. If the sleeve is made to catch in one of these notches the lower part, A', of the handle is retained in an angular or oblique position, and a handle is thus obtained which is of great convenience for brooms, brushes, and other articles. It can be made cheap. It is not liable to get out of order, and it can be readily so arranged that its lower part can be cut to any desired inclination.

If desired, the top of the lower part may be enlarged and provided with a great number of notches, and so arranged that it allows of setting the lower part at right angles to the upper part of the handle, or nearly so, although in most cases it is sufficient to supply the means to set the handle at a slight inclination.

What I claim as new, and desire to secure by Letters Patent, is—

The sleeve B, which slides on the upper part of a handle, in combination with one or more notches, *c*, in the top edge of the lower hinged part, A', of said handle, constructed and operating substantially as and for the purpose described.

The above specification of my invention signed by me this 7th day of February, 1866.

ALBERT ALDEN.

Witnesses:
M. M. LIVINGSTON,
W. HAUFF.